US008259594B2

(12) United States Patent
Field

(10) Patent No.: US 8,259,594 B2
(45) Date of Patent: Sep. 4, 2012

(54) METHOD FOR DETECTING VIDEO TILING

(75) Inventor: Brian E. Field, Evergreen, CO (US)

(73) Assignee: Comcast Cable Holding, LLC, Philadelphia, PA (US)

( * ) Notice: Subject to any disclaimer, the term of this patent is extended or adjusted under 35 U.S.C. 154(b) by 604 days.

(21) Appl. No.: 12/049,511

(22) Filed: Mar. 17, 2008

(65) Prior Publication Data

US 2009/0232007 A1    Sep. 17, 2009

(51) Int. Cl.
H04L 12/26 (2006.01)

(52) U.S. Cl. ........ 370/248; 370/242; 370/243; 370/246; 370/256; 370/432

(58) Field of Classification Search .................. 370/432, 370/242, 248, 243, 246, 256
See application file for complete search history.

(56) References Cited

U.S. PATENT DOCUMENTS

| | | | |
|---|---|---|---|
| 7,035,217 B1 | 4/2006 | Vicisano | |
| 7,269,536 B1 | 9/2007 | Gross et al. | |
| 7,474,632 B2 * | 1/2009 | Ban | 370/256 |
| 2005/0146426 A1 * | 7/2005 | Pereira et al. | 340/506 |
| 2006/0245364 A1 * | 11/2006 | Zhu et al. | 370/241 |
| 2007/0177523 A1 * | 8/2007 | Nagami et al. | 370/252 |
| 2007/0225926 A1 * | 9/2007 | Gross et al. | 702/69 |
| 2008/0298229 A1 * | 12/2008 | Ballantyne et al. | 370/218 |
| 2009/0158096 A1 * | 6/2009 | Ali et al. | 714/43 |
| 2009/0232007 A1 | 9/2009 | Field | |

OTHER PUBLICATIONS

EP Extended Search Report, 09250746.6, dated Jul. 13, 2009.
Srinivasan Jagannathan et al., "Using Tree Topology for Multicast Congestion Control," 2001 IEEE, pp. 313-320.
Youngsu Chae et al., "Exposing the network: Support for Topology-sensitive Applications," IEEE Openarch 2000, pp. 65-74.
Ramon Caceres, et al., "Impromptu measurement Infrastructures Using RTP," IEEE INFOCOM 2002, pp. 1490-1499.
Agisilaos-Georgios P. Ziotopoulos, et al., "Estimation of Network Link Loss Rates Via Chaining in Multicast Trees," IEEE 2001, pp. 2517-2520.
Individual Submission W Fenner AT&T Research S Casner Packet Design: "A traceroute facility for IP Multicast.; draft-fenner-traceroute-ipm-01.txt", IETF Standard Working Draft, Internet Engineering Task Force, IETF, CH, No. 1, Feb. 11, 2005.
Anoop Reddy, et al., "Large-Scale Fault Isolation," IEEE Journal on Selected Areas in Communications, vol. 18, No. 5, May 2000.

* cited by examiner

*Primary Examiner* — Huy D Vu
*Assistant Examiner* — Omer Mian
(74) *Attorney, Agent, or Firm* — Banner & Witcoff, Ltd.

(57) ABSTRACT

A method for detecting errors on an audio/video (A/V) data stream in a data service network includes providing multicast components operably coupled to each other via respective links for transmitting the A/V data stream to a user and for defining at least one multicast tree. The method further includes generating a state information signal indicative of a number of errors on the A/V data stream for at least one of the links and at least one of the plurality of multicast components. The method further includes determining the cumulative number of errors on the A/V data stream that are indicative of the number of errors for the at least one of the links and the at least one of the plurality of multicast components in the multicast tree in response to the state information signal.

18 Claims, 4 Drawing Sheets

US 8,259,594 B2

METHOD FOR DETECTING VIDEO TILING

BACKGROUND

1. Field of the Invention

The embodiments of the invention described herein generally relate to a method for detecting errors on a data stream that may cause video tiles.

2. Background Art

Video tiling is generally defined as blocks or other such impairments present in a video output while displayed which distort a picture that is intended for viewing by a user. Service providers such as video and high speed data service providers struggle in determining the source of the tiles. Video tiling causes customers to believe there are problems with video receivers provided by the service providers. Customers often place service calls with the service providers and require the service providers to inspect and replace the video receivers in the customer's residence or place of business if the video tiling in the video output is substantial. In some cases, the video receiver may be functioning properly, but is nonetheless switched with another video receiver since the service provider is unable to determine the origin of errors within a multicast tree that cause video tiling.

A service provider network may include a number of multicast trees. Any given multicast tree in the network may include one or more video receivers operably coupled to one or more routers and one or more transmission sources. The video receivers, routers, and transmission sources are generally coupled to each via fiber links which span large distances. The transmission source transmits an audio/video (A/V) data stream to the routers via the links. The routers, in turn, direct the A/V data stream over the links to other routers or various video receivers. It is not uncommon while transmitting the A/V data stream for errors which produce video tiling to occur at the transmission source, the router, or the receiver. Such errors may also occur at the various links coupled between the transmission source, routers, and receivers located in the multicast tree. Existing approaches are not capable of providing service technicians the ability to determine the origin of errors in a multicast tree.

BRIEF DESCRIPTION OF THE DRAWINGS

The embodiments of the present invention described herein are recited with particularity in the appended claims. However, other features will become more apparent and the embodiments of the present invention may be best understood by referring to the following detailed description in conjunction with the accompany drawings in which:

DETAILED DESCRIPTION OF THE PREFERRED EMBODIMENT(S)

Figure 1:
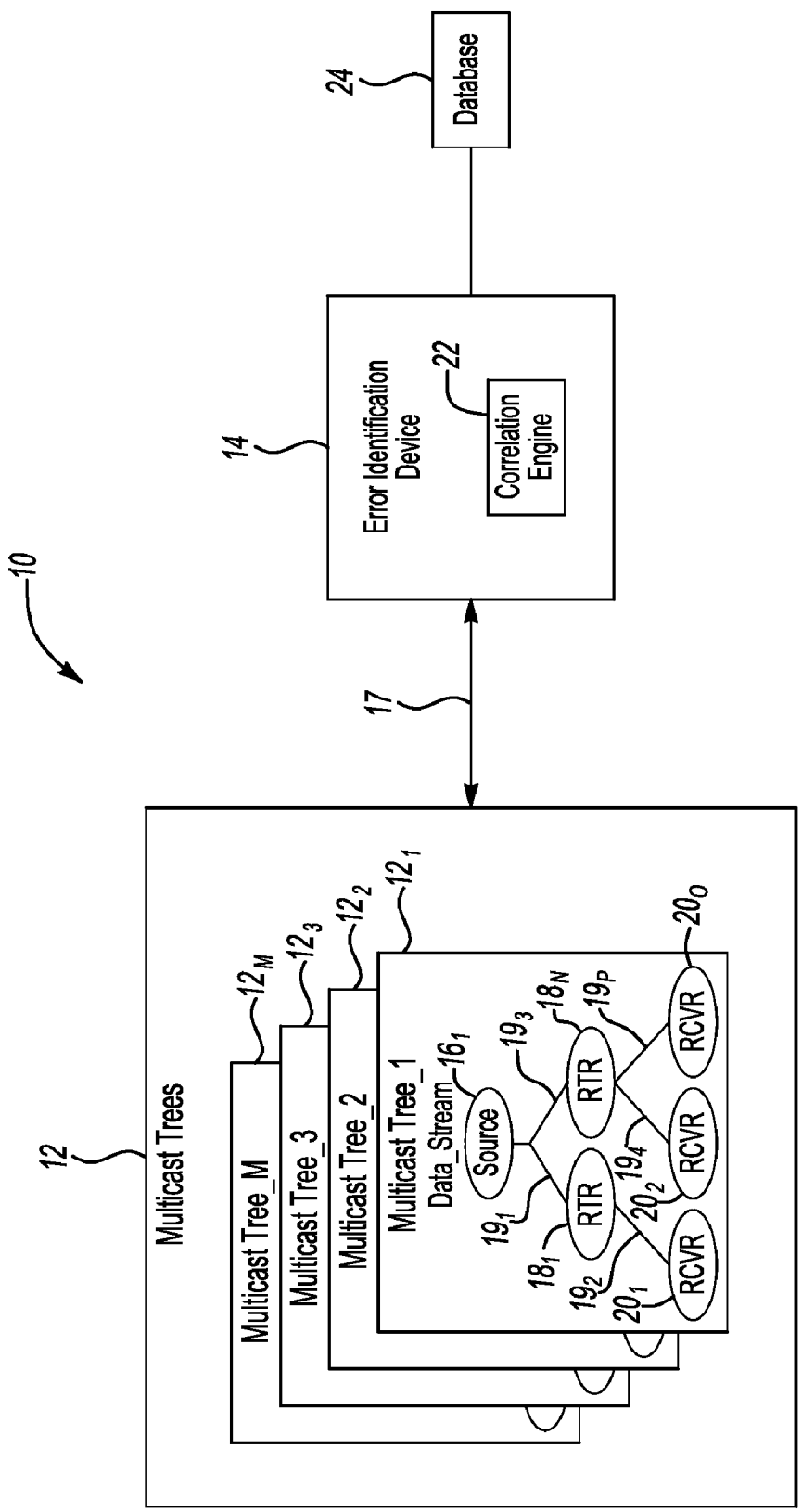
FIG. 1 depicts a system for detecting video tiles in accordance to one embodiment of the present invention.

FIG. 1 depicts a system 10 for detecting video tiling in accordance to one embodiment of the present invention. The exemplary system 10 includes a plurality of multicast trees $12_1$-$12_M$ and an error identification device 14. For any given data service network, a service provider may provide audio visual data or high speed data to the plurality of multicast trees $12_1$-$12_M$. Specific multicast trees may be designated to transmit audio visual data to various zones or regions within a particular country. Each multicast tree 12 includes a transmission source 16 ($12_1$ has $16_1$, $12_2$ has $16_2$ ... $12_M$ has $16_M$). The transmission source 16 is adapted to generate an A/V data stream. The A/V data stream comprises a plurality of packets. Each packet may include video or audio data (or both).

A plurality of routers $18_1$-$18_N$ are adapted to receive the A/V data stream from each of the source $16_M$. A plurality of receivers $20_1$-$20_O$ are operably coupled to the routers $18_1$-$18_N$. In the illustrated example, the router $18_1$ directs the A/V data stream to the receiver $20_1$. The router $18_N$ directs the A/V data stream to the receivers $20_2$ and $20_O$. The receivers $20_1$-$20_O$ are adapted to present the A/V data to an end user for viewing. The source $16_1$, routers $18_1$-$18_N$, and receivers $20_1$-$20_O$ are generally defined as multicast components within the multicast tree $12_1$ and co-act with each other to transmit the A/V data stream to an end viewer. In general, all references made specifically to the multicast tree $12_1$ generally apply equally to the multicast trees $12_2$-$12_M$. For example, each multicast tree $12_2$-$12_M$ may include any number of multicast components such as the transmission source, the routers, and the receivers. It is generally understood that each multicast tree $12_1$-$12_M$ may include different or equal amounts of sources, routers, and receivers from one another. Further, the particular arrangement of the sources, routers, and receivers may vary or be similar to one another for each multicast tree $12_1$-$12_M$.

Each multicast component (e.g., 16, $18_1$-$18_N$, and $20_1$-$20_O$) in the multicast trees $12_1$-$12_M$ are operably coupled together via a plurality of fiber links $19_1$-$19_P$. With respect to the exemplary multicast tree $12_1$, the source $16_1$ and the router $18_1$ are coupled together via the link $19_1$. The router $18_1$ and the receiver $20_1$ are operably coupled together via the link $19_2$. The source $16_1$ and the router $18_N$ are operably coupled together via the link $19_3$. The router $18_N$ and the receiver $20_2$ are operably coupled together via the link $19_4$. The router $18_N$ and the receiver $20_O$ are operably coupled together via the link $19_P$. In general, each multicast component transmits the A/V data stream to the next multicast component downstream in the trees $12_1$-$12_M$ via a corresponding link.

In addition, each receiver coupled to the source via a particular router is generally defined as a path within a given multicast tree $12_1$-$12_M$. In the illustrated embodiment, the multicast tree $12_1$ includes a total of three paths. The source $16_1$, the link $19_1$, the router $18_1$, the link $19_2$ and the receiver $20_1$ form a first path. The source $16_1$, the link $19_3$, the router $18_N$, the link $19_4$ and the receiver $20_2$ form a second path. The source $16_1$, the link $19_3$, the router $18_N$, the link $19_P$, and the receiver $20_O$ form a third path. In general, each multicast tree $12_1$-$12_M$ is generally adapted to include one or more paths for transmitting the A/V data stream to a user for viewing. Each link or path within a corresponding multicast tree $12_1$-$12_M$ may span thousands of kilometers for a given region or part of the country. Errors attributed to the transmission of the A/V data stream within the network (e.g., from a source to a router and/or from a router to a receiver via corresponding links) in any given path may generate errors that may cause video tiling at a given receiver. In addition, a number of video impairments (or video tiling) may be due to fabric errors. Each router generally includes one or more interfaces (or line cards). A fabric (or communication path) is generally present between all line cards. Video tiling events may be caused due to problems on the fabric(s) present between the line cards. In some instances, the fabric may include intermittent transmission problems. Such problems may cause packet corruption or lead to packet(s) being dropped as the packet is transmitted from one line card to another (e.g., all line cards internal to the same router).

The error identification device 14 is operably coupled to the multicast trees $12_1$-$12_M$ via a data communication line 17. The error identification device 14 is configured to determine the cumulative number of errors present within each link, path, and/or router of the multicast trees $12_1$-$12_M$ so that service technicians can determine the growth of errors in a particular multicast tree $12_1$-$12_M$ over any period of elapsed time. As note above, errors related to the router may be fabric errors. Such errors (transmission errors on the links and/or paths, and fabric errors associated with the routers) may contribute to the presence of video tiling at a receiver. With respect to the multicast tree $12_1$, each router $18_1$-$18_N$ is configured to transmit a state information signal for every directly connected link in the multicast tree $12_1$ to the error identification device 14 via the data communication line 17.

The state information signal includes the number of packets transmitted and received from each multicast component (e.g., $16_1$, $18_1$-$18_N$, $20_1$-$20_O$) for the corresponding link and the number of packets received at each multicast component over the corresponding link with an error for every path in the multicast tree $12_1$. For example, the router $18_1$ may provide the number of packets successfully transmitted from the source $16_1$ to the router $18_1$ and the number of packets with errors received by the router $18_1$ to the error identification device 14 with the state information signal. The router $18_1$ may also provide the number of packets transmitted from the router $18_1$ to the receiver $20_1$ with an error to the error identification device 14 with the state information signal.

In addition, the router $18_1$ may also include the number of packets that may be dropped due to errors in the state information signal. Such errors may be due to transmission issues (e.g., cyclic redundancy check (CRC) errors), interface overruns (e.g., contention for resources within the routers), transmission issues within each router (e.g., switch fabric errors), or output drops which are caused due to excessive loads on the transmitting interface. The router $18_1$ obtains packet count information (e.g., packets lost due to CRC errors, fabric issues, etc.). As noted above, each router $18_1$ and $18_N$ generally includes a number of interfaces. Multicast content (e.g., A/V data stream) may flow over any one or more of the interfaces to a corresponding router $18_1$ and $18_N$. The routers $18_1$ and $18_N$ perform a CRC error coding scheme which adds redundant bits within the packets of the A/V data stream to indicate which packets in the A/V data stream includes an error for a particular multicast component.

CRC is generally defined as the process whereby a transmitting device embeds a calculation value along with audio and visual data in a packet in a data stream prior to transmitting the data stream. The receiving device repeats a similar calculation to obtain the similar calculation value for comparing the value embedded with the audio and video data in a packet after transmitting the data stream. If both the transmitting device and the receiving device obtain the same result, the particular packet transmitted is assumed to be error free. If the receiving device obtains a different result from that of the transmitting device, an error is presumed to have occurred and the packet is discarded.

In general, the routers $18_1$ and $18_N$ determine when an interface that belongs to a multicast component drops a packet. The routers $18_1$ and $18_N$ may be configured to report abstract errors which may result in packets being dropped. Such errors may be related to errors on the link or errors associated with the routers $18_1$ and $18_N$. Each router $18_1$ and $18_N$ is periodically queried by the error identification device 14 to transmit the state information signal over the data communication line 17 to the error identification device 14.

Each router $18_1$-$18_N$ is also periodically queried by the error identification device 14 to transmit an identification signal over the data communication line 17 to the error identification device 14. Router $18_1$ is generally configured to track packet data received and transmitted on interfaces belonging to the router $18_1$. Likewise, the router $18_N$ is generally configured to track packet data received and transmitted on interfaces that belong to the router $18_N$. In general, each router $18_1$ and $18_N$ provides a local view of the multicast tree by tracking corresponding interfaces (e.g., which belong to each router $18_1$ and router $18_N$, respectively) for incoming and outgoing packets of multicast content. Each router $18_1$ and $18_N$ transmits the tracked incoming and outgoing packets on a given interface over the identification signal to the error identification device 14. The error identification device 14 includes a correlation engine 22 for assembling the local views provided by each router $18_1$ and $18_N$ into a single end-to-end view (e.g., from source to receiver across each path) to generate an electronic logical representation of the multicast tree $12_1$. In response to generating the logical representation of the multicast tree $12_1$ (e.g., determining corresponding paths from the source to every receiver), the correlation engine 22 also associates the number of packets lost due to error.

The routers $18_1$-$18_N$ are adapted to provide the tracked incoming and outgoing packets on a given interface by executing a protocol independent multicast (PIM) and an internet group membership protocol (IGMP). IGMP is generally defined as a signaling protocol that is used by any one or more of the receivers to express interest in a particular multicast group to a corresponding router. The router $18_1$-$18_N$ use the PIM to build the multicast tree $12_1$-$12_M$ from the receiver back to the transmission source. In general, the routers themselves may not understand what a particular multicast tree looks like from the source to all receivers. Instead, a single router (or each router) understands the particular interface on which a specific multicast feed is expected to arrive and the interfaces the single router is expected to transmit the multicast content on. The correlation engine 22 gathers this information in response to querying the routers $18_1$-$18_N$. The correlation engine 22 processes and combines this per router information into an end-to-end logical representation for each multicast tree 12-12. A user interface visually displays the logical representation for the multicast tree.

A database 24 is coupled to the error identification device 14 for storing information received via the state information signal and the identification signal. The error identification device 14 is adapted to calculate the cumulative number of errors for any link or path over a predefined time frame in response to receiving the state information signal. The error identification device 14 determines the cumulative number of errors based on errors present in the links, paths and/or the routers. The predefined time frame may correspond to the last N hours or days. The error identification device 14 is further configured to associate the cumulative number of errors for each link and path in the multicast trees $12_1$-$12_M$ after generating the logical representation for each multicast tree $12_1$-$12_M$. This characteristic will be discussed in more detail in connection with FIG. 2. The error identification device 14 allows a user to select a corresponding time frame (e.g., 1 hour, 7 hours, 24 hours, or 7 days) to view the cumulative number of errors for each link and path (via the user multicast component) within a particular multicast tree $12_1$-$12_M$. The errors may be caused or attributed to various overdrive conditions at the multicast components within the routers, or by problematic fiber links in the network.

In general, the source $16_1$ and the receivers $20_1$-$20_O$ are configured to generate alerts as simple network management protocol (SNMP) traps in response to detecting errors while receiving the incoming A/V data stream. The source $16_1$ and/or the receivers $20_1$-$20_O$ transmit the alerts to the correlation engine 22 in response to detecting errors in real time (or asynchronously). The alerts generated by the source $16_1$ and/or the receivers $20_1$-$20_O$ may be indicative of whether a surge of errors are occurring over the network and whether there may be any new errors on any multicast component of the path from the source to the receiver. The correlation engine 22 receives the alerts and determines the particular multicast tree $12_1$-$12_M$ that is impacted and displays such information to service personnel. In response to receiving the alerts, the correlation engine 22 may confirm the operational integrity of the affected multicast component, link or path in any or all of multicast trees $12_1$-$12_M$. If errors on the path from the source to the receiver are confirmed and are temporally aligned with the alerts, then the correlation engine 22 may be adapted to alert service personnel as to the root cause of the errors to allow support personnel to fix or minimize the impact of the link or router errors.

Figure 2:
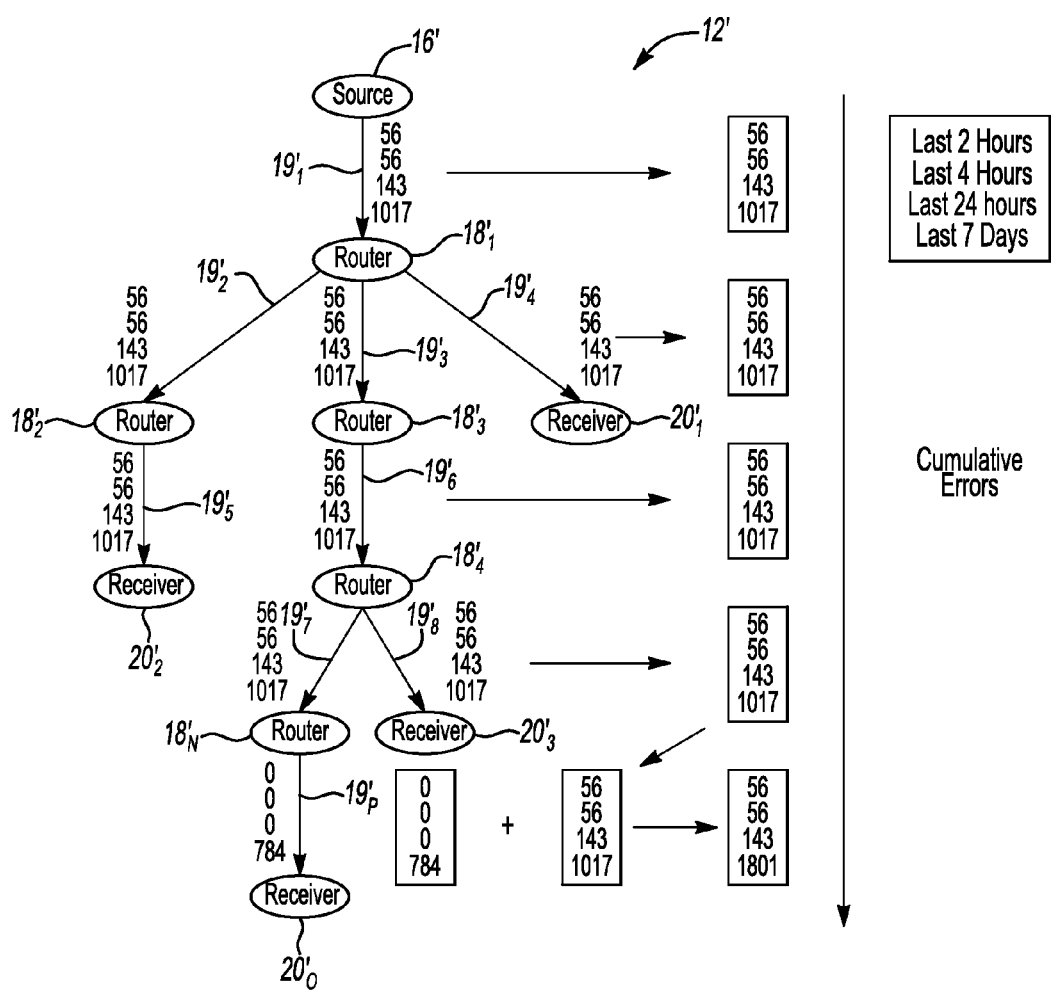
FIG. 2 depicts a logical representation of a multicast tree generated by the error detection device.

FIG. 2 depicts an example of a logical representation of a multicast tree 12' generated by the error identification device 14. The multicast tree 12' includes a source 16', a plurality of routers $18_1'$-$18_N'$, and a plurality of receives $20_1'$-$20_O'$. The source 16', routers $18_1'$-$18_N'$, and receivers $20_1'$-$20_O'$ are coupled to each other via a plurality of links $19_1'$-$19_P'$. FIG. 2 illustrates that the link $19_1'$ exhibits 56 errors over the last two hour period, 56 errors over the last four hour period, 143 errors over the last twenty-four hour period, and 1017 errors over the last seven day period. No additional errors were detected with respect to links $19_2'$-$19_8'$. FIG. 2 depicts the detection of 784 errors over the last seven day period and no errors for the last two, four, and twenty-four hour periods for the link $19_P'$. In response to detecting number of errors for the link $19_P'$, the error identification device 14 determines that the cumulative number of errors for the path (e.g., $19_1'$-$19_P'$) is 56 errors for the last two hour period, 56 errors for the last four hour period, 143 errors for the last twenty-four hour period, and 1801 errors for the last seven day period. The errors visually displayed next to each link of FIG. 2 may be caused due to issues or errors related to the links, paths, and/or the routers.

Figure 3:
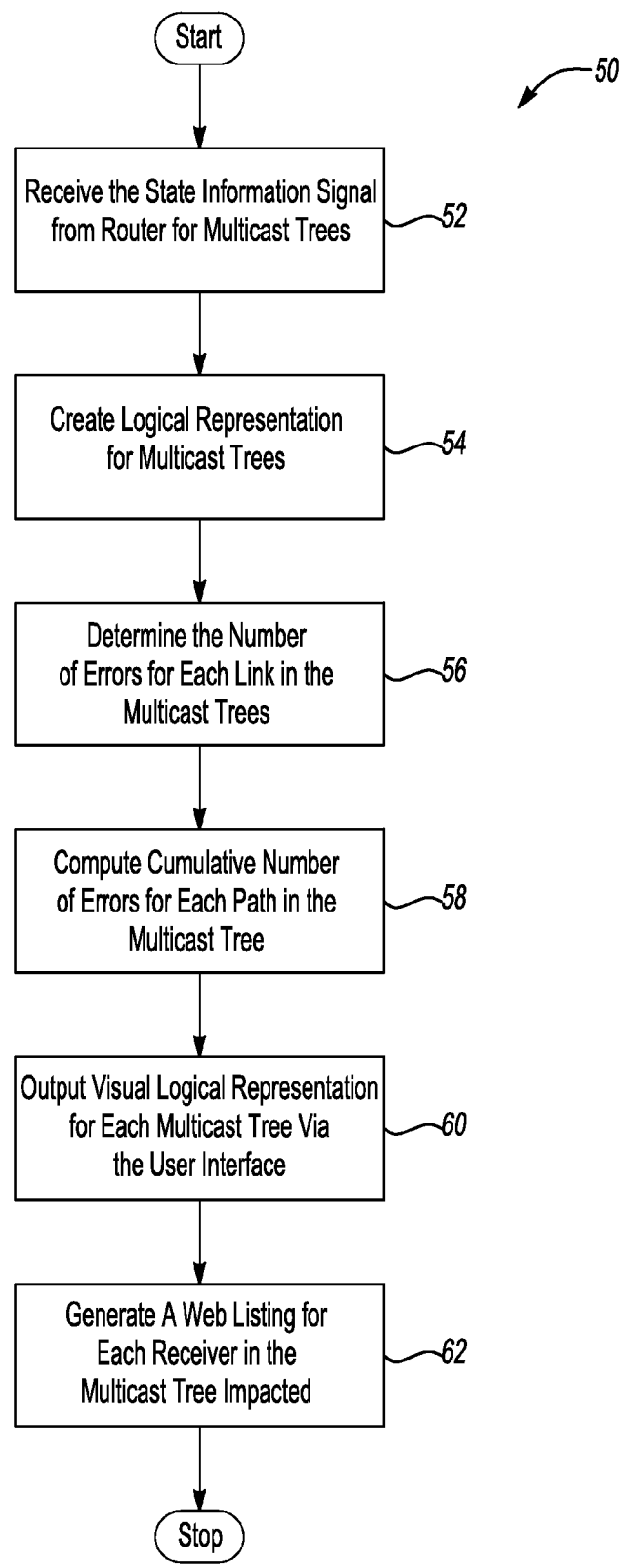
FIG. 3 depicts a method for displaying and reporting the number of error events detected by the system of FIG. 1.

FIG. 3 depicts a method 50 for displaying and reporting errors as detected by the system 10. In general, the method 50 is to be executed prior to utilizing the correlation engine 22 to receive alerts from the source $16_1$ and the receivers $20_1$-$20_O$.

In block 52, the error identification device 14 receives the identification signal from the routers in each multicast tree $12_1$-$12_M$.

In block 54, the error identification device 14 (or the correlation engine 22) creates a logical representation for each multicast tree $12_1$-$12_M$ (including all applicable multicast components and links) in response to the identification signal transmitted by the routers. For example, the error identification device 14 maps and derives all of the end-to-end paths for each multicast tree $12_1$-$12_M$.

In block 56, the error identification device 14 determines the number of errors on each link $19_1$-$19_P$ for a predefined time frame (e.g., 2 hours, 4 hours, 24 hours, 7 days, etc.).

In block 58, the error identification device 14 considers every path (e.g. from the source down to the receiver) in each multicast tree $12_1$-$12_M$ to compute the cumulative number of errors for each path (which includes errors caused by the links, paths, and/or routers) in each multicast tree $12_1$-$12_M$.

In block 60, the error identification device 14 outputs the visual logical representation for each multicast tree $12_1$-$12_M$ via the user multicast component. The visual logical representation depicts the cumulative number of errors at each link and path for a predefined time frame.

In block 62, the error identification device 14 generates a web listing for each receiver impacted by the cumulative errors and sorts the receivers based on the number of errors detected per receiver. The error identification device 14 may generate the web listing into a color-coded matrix which indicates hot spots or potential problem areas for each multicast component in the multicast tree $12_1$-$12_M$ that may be generating errors which result in video tiling. The user multicast component visually displays the listing.

Figure 4:
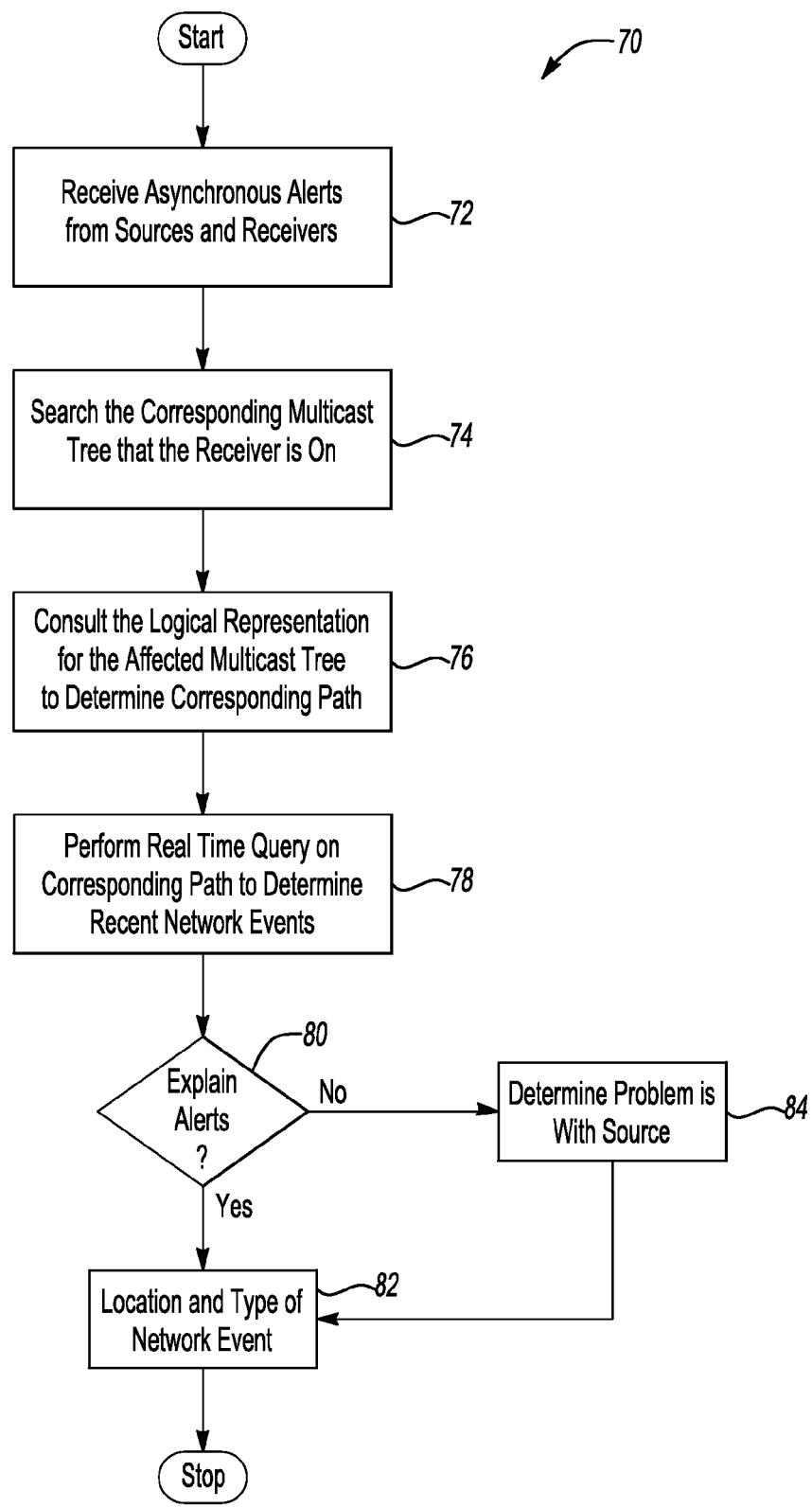
FIG. 4 depicts a method for detecting the root cause of the video tiles detected by the system of FIG. 1.

FIG. 4 depicts a method 70 for receiving alerts based on errors present in the A/V data stream. The method 70 is generally executed after the error identification device 14 generates the logical representation for each multicast tree $12_1$-$12_M$.

In block 72, the correlation engine 72 is adapted to receive asynchronous (or event based) alerts or notifications from any one or more of the sources or receivers in the multicast trees $12_1$-$12_M$ any time such errors are detected by the sources or receivers.

In block 74, the correlation engine 22 determines which multicast tree $12_1$-$12_M$ from the logical representation of the multicast trees $12_1$-$12_M$ includes a source or receiver that detects errors associated with the A/V data stream.

In block 76, the correlation engine 22 consults the logical representation for the affected multicast tree $12_1$-$12_M$ as identified in block 74 to determine the corresponding paths from the source to each receiver for the affected multicast trees $12_1$-$12_M$.

In block 78, the correlation engine 22 performs a real-time query on the applicable paths identified in block 76 to determine if there has been any recent network events which triggered the sources or receivers to transmit the alerts as noted in connection with block 72. Such network events may include hard or soft failures. The hard failures may include fiber line cuts, xenpack failures, transport issues, or central processing unit (CPU) spikes. The soft failures may include marginal xenpack transports, loose or dirty connections, or various component overloads (e.g., such overloads may be associated with application specific integrated circuits (ASICs), line cards, or fabric fibers).

In block 80, the correlation engine 22 attempts to determine the root cause for the errors based on whether recent network events (e.g., hard or soft failures) are detectable. If a recent network event (e.g., hard or soft failure) is detected, the method 70 moves to block 82. If a recent network event cannot be detected, the method 70 moves to block 84.

In block 82, the correlation engine 22 outputs the location (e.g., link and path) and the type of network event responsible for creating the error associated with the A/V data stream via the user multicast component.

In block 84, the correlation engine 22 determines that the root cause for the errors may be attributed with a particular transmission source in the affected multicast tree $12_1$-$12_M$ or with the actual content that is flowing into a particular transmission source. In such a case, the correlation engine 22 outputs via the user multicast component that a network event was not detected and that the problem may be with a particular transmission source or the data flowing into the transmission source.

The embodiments of the present invention provide for an error identification device 14 which is capable of mapping multicast components, links, and paths for each multicast tree $12_1$-$12_M$. The error identification device 14 is further adapted to receive the state information signal and the identification signal from routers $18_1$-$18_N$ within each multicast tree $12_1$-$12_M$ to determine the cumulative number of errors per link and the cumulative number of errors per path and to provide a logical representation of such data (e.g., such errors may be attributed to the links, paths and/or the routers). The error identification device 14 provides the logical representation of the multicast trees $12_1$-$12_M$ and the cumulative number of errors per link and path to allow service technicians to diagnose and troubleshoot problem areas based on the cumulative number of errors shown in the logical representation. In response to the error identification device 14 generating a logical representation of the multicast trees $12_1$-$12_M$, the correlation engine 22 monitors the sources $16_1$ and the receivers $20_1$-$20_O$ in real-time for error alerts associated with the transmission of the A/V data stream. In response to such alerts, the correlation engine 22 provides service technicians the ability to determine the number of errors impacting each of the multicast trees $12_1$-$12_M$ in real time before the errors associated with the transmission of the A/V data stream through the various links and paths grow into major problems. Such capability allows service technicians to troubleshoot and fix errors that may cause video tiling and may minimize exposure of the video tiling for the user.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A method, comprising:
    receiving first data indicative of a plurality of errors in a multicast data stream that is propagating through a network;
    receiving second data indicative of a plurality of links in the network;
    determining by a computer a path through which the multicast data stream propagates, the path comprising at least some of the links;
    determining by the computer, for each of the links in the path, a cumulative number of the errors in the multicast data stream that occur along the respective link over a plurality of overlapping periods of time;
    determining by the computer, based upon the determined cumulative number of errors in each of the links in the path, a cumulative number of the errors in the multicast data stream that occur along the path over each of the periods of time; and
    displaying, by a display device, a user interface that comprises:
        a graphical representation of the links coupled together in the path,
        an indication, for each of the graphically represented links, of the determined cumulative number of errors that occur along the respective link for each of the periods of time, and
        an indication of the determined cumulative number of errors that occur along the path for each of the periods of time.

2. The method of claim 1, further comprising:
    determining, by the computer, a plurality of receivers in the multicast data stream that are impacted by the plurality of errors; and
    determining, by the computer, a web listing for each of the determined receivers.

3. The method of claim 1, wherein said determining the path comprises determining the path from a plurality of paths, and wherein the method further comprises:
    performing, by the computer, and responsive to the errors, a real-time query of the determined path; and
    determining, by the computer, based on a network event identified as a result of the query, whether the network event triggered the errors.

4. The method of claim 1, wherein said displaying the graphical representation comprises displaying the graphical representation as a plurality of nodes interconnected by a plurality of lines, the lines representing the links.

5. The method of claim 1, wherein said displaying the indications comprises displaying each of the indications proximate to the line representing the link associated with the respective one of the indications.

6. The method of claim 5, wherein the indications each comprise a textually-depicted numerical value.

7. A non-transitory computer-readable storage medium storing computer-executable instructions for performing a method by a computer, the method comprising:
    receiving first data indicative of a plurality of errors in a multicast data stream that is propagating through a network;
    receiving second data indicative of a plurality of links in the network;
    determining a path through which the multicast data stream propagates, the path comprising at least some of the links;
    determining, for each of the links in the path, a cumulative number of the errors in the multicast data stream that occur along the respective link over a plurality of overlapping periods of time; and
    determining, based upon the determined cumulative number of errors in each of the links in the path, a cumulative number of the errors in the multicast data stream that occur along the path over each of the periods of time; and
    causing a display device to display a user interface that comprises:
        a graphical representation of the links coupled together in the path,
        an indication, for each of the graphically represented links, of the determined cumulative number of errors that occur along the respective link for each of the periods of time, and
        an indication of the determined cumulative number of errors that occur along the path for each of the periods of time.

8. The non-transitory computer-readable medium of claim 7, wherein the method further comprises:
    determining a plurality of receivers in the multicast data stream that are impacted by the plurality of errors; and
    determining a web listing for each of the determined receivers.

9. The non-transitory computer-readable medium of claim 7, wherein said determining the path comprises determining the path from a plurality of paths, and wherein the method further comprises:
    performing, responsive to the errors, a real-time query of the determined path; and determining, based on a network event identified as a result of the query, whether the network event triggered the errors.

10. The non-transitory computer-readable medium of claim 7, wherein said displaying the graphical representation comprises displaying the graphical representation as a plurality of nodes interconnected by a plurality of lines, the lines representing the links.

11. The non-transitory computer-readable medium of claim 10, wherein said displaying the indications comprises displaying each of the indications proximate to the line representing the link associated with the respective one of the indications.

12. The non-transitory computer-readable medium of claim 11, wherein the indications each comprise a textually-depicted numerical value.

13. A method, comprising:
receiving data indicative of a plurality of errors in a plurality of multicast data streams that are propagating through a network;
selecting, by a computer, one of the multicast data streams based on the data, the selected multicast data stream comprising a plurality of links;
determining, by the computer, a path through which the multicast data stream propagates, the path comprising at least some of the links;
determining by the computer, for each of the links in the path, a cumulative number of the errors in the selected one of the multicast data streams that occur along the respective one of the links over each of a first period of time and a second period of time, the first and second periods of time overlapping; and
displaying, by a display device, a user interface that comprises:
a graphical representation of the links coupled together in the path,
an indication, for each of the graphically represented links in the path, of the determined cumulative number of errors that occur along the respective one of the links for each of the first and second periods of time, and
an indication of a cumulative number of errors that occur along the path for each of the first and second periods of time.

14. The method of claim, further comprising:
determining, by the computer, a plurality of receivers in the selected one of the multicast data streams that are impacted by the plurality of errors; and
determining, by the computer, a web listing for each of the determined receivers.

15. The method of claim 13, wherein said determining the path comprises determining the path from a plurality of paths, and wherein the method further comprises:
performing, by the computer, and responsive to the errors, a real-time query of the determined path; and
determining, by the computer, based on a network event identified as a result of the query, whether the network event triggered the errors.

16. The method of claim 13, wherein said displaying the graphical representation comprises displaying the graphical representation as a plurality of nodes interconnected by a plurality of lines, the lines representing the links.

17. The method of claim 16, wherein said displaying the indications comprises displaying each of the indications proximate to the line representing the link associated with the respective one of the indications.

18. The method of claim 17, wherein the indications each comprise a textually-depicted numerical value.

\* \* \* \* \*

UNITED STATES PATENT AND TRADEMARK OFFICE
CERTIFICATE OF CORRECTION

PATENT NO. : 8,259,594 B2
APPLICATION NO. : 12/049511
DATED : September 4, 2012
INVENTOR(S) : Brian E. Field Page 1 of 1

It is certified that error appears in the above-identified patent and that said Letters Patent is hereby corrected as shown below:

In the Specification

Column 6, Line 19:
  Please delete "the AN data" and replace with --the A/V data--

In the Claims

Column 8, Claim 5, Line 20:
  Please delete "claim 1" and replace with --claim 4--

Column 10, Claim 14, Line 11:
  Please delete "claim," and replace with --claim 13,--

Signed and Sealed this
Thirteenth Day of August, 2013

Teresa Stanek Rea
*Acting Director of the United States Patent and Trademark Office*